(12) United States Patent
Johnson et al.

(10) Patent No.: US 12,165,143 B2
(45) Date of Patent: *Dec. 10, 2024

(54) SYSTEM AND METHOD FOR OBFUSCATING TRANSACTION INFORMATION

(71) Applicant: Capital One Services, LLC, McLean, VA (US)

(72) Inventors: Kyle Johnson, Arlington, VA (US); Michael Mossoba, Great Falls, VA (US); Abdelkader Benkreira, New York, NY (US); Robert Perry, Ashburn, VA (US); Austen Novis, Jamestown, RI (US); Max Miracolo, Brooklyn, NY (US); Natasha Mitchko, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,528

(22) Filed: Mar. 13, 2023

(65) Prior Publication Data

US 2023/0214828 A1     Jul. 6, 2023

Related U.S. Application Data

(63) Continuation of application No. 16/846,532, filed on Apr. 13, 2020, now Pat. No. 11,631,078.

(51) Int. Cl.
*G06Q 20/00* (2012.01)
*G06F 16/23* (2019.01)
(Continued)

(52) U.S. Cl.
CPC ....... *G06Q 20/383* (2013.01); *G06F 16/2379* (2019.01); *G06F 21/6254* (2013.01);
(Continued)

(58) Field of Classification Search
CPC .......... G06Q 20/383; G06Q 10/08345; G06Q 30/0205; G06Q 30/0206; G06Q 50/265;
(Continued)

(56) References Cited

U.S. PATENT DOCUMENTS

| | | |
|---|---|---|
| 7,213,748 B2 | 5/2007 | Tsuei et al. |
| 7,693,798 B2 | 4/2010 | Anderson et al. |

(Continued)

FOREIGN PATENT DOCUMENTS

WO     0137180 A1    5/2001

*Primary Examiner* — Dante Ravetti
(74) *Attorney, Agent, or Firm* — Bookoff McAndrews, PLLC (57) ABSTRACT

A computer-implemented method for anonymizing online transaction details may include performing a process to generate an identifier (ID) and reference address for a user, and receiving a request for transaction processing from an e-commerce server. The request may include first data including: information associated with a purchase of a product to be delivered to the user; the identifier; and the reference address. The method may further include: in response to the request, determining whether the ID and reference address are included in the request, and if so, obtaining the accurate address and shipping rate rules; applying, based on the first data and the accurate address, the shipping rate rules to determine accurate shipping rate cost information associated with delivering the product to the accurate address; performing an anonymizing process on the accurate information to obtain anonymous shipping rate information, and transmitting the anonymous shipping rate information to the e-commerce server.

20 Claims, 6 Drawing Sheets

(51) Int. Cl.
  *G06F 21/62*      (2013.01)
  *G06Q 10/0834*    (2023.01)
  *G06Q 20/38*      (2012.01)
  *G06Q 30/0201*    (2023.01)
  *G06Q 30/0204*    (2023.01)
  *G06Q 50/26*      (2012.01)

(52) U.S. Cl.
  CPC ... *G06Q 10/08345* (2013.01); *G06Q 30/0205* (2013.01); *G06Q 30/0206* (2013.01); *G06Q 50/265* (2013.01); *G06Q 2220/00* (2013.01)

(58) Field of Classification Search
  CPC .......... G06Q 2220/00; G06Q 20/3821; G06Q 20/405; G06Q 30/06; G06Q 10/00; G06F 16/2379; G06F 21/6254; H04L 2209/42; H04L 2209/56; H04L 9/3213
  USPC ................. 705/16, 21, 59; 380/44, 262, 278
  See application file for complete search history.

(56) References Cited

U.S. PATENT DOCUMENTS

| | | |
|---|---|---|
| 9,105,059 B2 | 8/2015 | Gluzberg et al. |
| 2001/0044785 A1 | 11/2001 | Stolfo et al. |
| 2002/0091650 A1* | 7/2002 | Ellis .................... G06Q 20/383 |
| | | 705/74 |
| 2012/0221421 A1 | 8/2012 | Hammad |
| 2019/0311325 A1 | 10/2019 | Reblin et al. |

* cited by examiner

SYSTEM AND METHOD FOR OBFUSCATING TRANSACTION INFORMATION

CROSS-REFERENCE TO RELATED APPLICATION(S)

This patent application is a continuation of, and claims the benefit of priority to, U.S. Nonprovisional patent application Ser. No. 16/846,532, filed on Apr. 13, 2020, the entirety of which is incorporated herein by reference.

TECHNICAL FIELD

Various embodiments of the present disclosure relate generally to obfuscating transaction information, and more particularly to methods and systems for anonymizing shipping information.

BACKGROUND

A customer may desire to do business with a merchant without providing personally identifying information such as the customer's name or address. While in-person transactions may be completed with a bearer instrument (e.g., cash or a pre-paid card) that does not require provision of any personal information, remote transactions conducted via mail, telephone, an electronic network, or the like which involve a physical delivery of a product to the customer generally necessitate that the customer provides personally identifying information in order to enable the delivery.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for obfuscating personally identifying information. Each of the examples disclosed herein may include one or more of the features described in connection with any of the other disclosed examples.

In one example, a method for anonymizing online transaction details may include: performing a process to generate an identifier (ID) and a reference address to be used by a user; receiving a request for transaction processing from an e-commerce server; in response to receiving the request for the transaction processing, determining whether the ID and the reference address are included in the request for the transaction processing; when the determining determines the ID and the reference address are included in the request for the transaction processing, obtaining a user address based on the ID and the reference address and obtaining shipping rate rules; applying the shipping rate rules to the user address to obtain accurate shipping rate information; and performing an anonymizing process to the accurate shipping rate information to obtain anonymous shipping rate information.

In another example, a system for anonymizing online transaction details may include: a memory storing instructions; and a processor executing the instructions to perform a process. The process may include: receiving a request for transaction processing from an e-commerce server; in response to receiving the request for the transaction processing, determining whether an identifier (ID) and a reference address are included in the request for the transaction processing; when the determining determines the ID and the reference address are included in the request for the transaction processing, obtaining a user address based on the ID and the reference address and obtaining shipping rate rules; applying the shipping rate rules to the user address to obtain accurate shipping rate information; and performing an anonymizing process to the accurate shipping rate information to obtain anonymous shipping rate information.

In a further example, a method for anonymizing online transaction details may include: receiving a request for transaction processing from an e-commerce server; in response to receiving the request for the transaction processing, determining whether an identifier (ID) and a reference address are included in the request for the transaction processing; when the determining determines the ID and the reference address are included in the request for the transaction processing, obtaining a user address based on the ID and the reference address and obtaining shipping rate rules; applying the shipping rate rules to the user address to obtain accurate shipping rate information; performing an anonymizing process to the accurate shipping rate information to obtain anonymous shipping rate information, the anonymizing process including: obtaining an anonymizing function; and applying the anonymizing function to the accurate shipping rate information to obtain the anonymous shipping rate information; and transmitting the anonymous shipping rate information to the e-commerce server, wherein the anonymizing function adjusts the estimated shipping rate to obfuscate the user address by one or a combination of: increasing the estimated shipping rate by a first amount, the first amount corresponding to an estimated shipping rate for a different zip code, city, and/or state than the user address; increasing or decreasing the estimated shipping rate by a second amount, the second amount corresponding to a random variable; increasing or decreasing the estimated shipping rate by a third amount, the third amount corresponding to an estimated shipping rate for a different address than the reference address of a plurality of addresses associated with one or more delivery services, the user being charged separately from an amount charged by the e-commerce server for any difference in actual shipping costs, the e-commerce server being instructed to ship the item(s) to the different shipping address; and/or increasing or decreasing the estimated shipping rate by a scaling factor, the scaling factor corresponding to a scalable area surrounding the user address, the scalable area being adjustable by the user, the scalable area corresponding to a range of estimated shipping rates for addresses within the scalable area.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

As used herein, the term "dealer" may indicate, and may be used interchangeably with, a seller of items or services, a vendor of items or services, etc. The term "client" may indicate, and may be used interchangeably with, a customer, buyer, person attempting to obtain a lease, ownership, ownership share, etc., of an item and/or service.

In general, the present disclosure provides methods and systems for obfuscating transaction information, and more particularly to methods and systems for anonymizing shipping information. As will be discussed below in more detail, in methods and systems according to the present disclosure, existing techniques may be improved.

Engaging in a transaction may carry with it an amount of risk. Beyond risk associated with completion of the transaction itself, i.e. whether goods or services purchased are delivered or are acceptable, other risks may persist after the transaction is completed. Some of these risks may result from personally identifying information that was provided by a customer to a vendor in order to facilitate fulfilling the transaction. For example, a remote transaction, such as a purchase requiring delivery of a product, generally requires a customer to provide an accurate shipping address and other information to facilitate delivery of the product. However, such information may be retained by the vendor and/or provided to other entities that may send the customer unsolicited mail, engage in fraud based on the customer's identify, or store the personally identifying information in a manner vulnerable to attack. Therefore, a customer may desire to do business with a vendor without providing personally identifying information.

Techniques have been developed that are usable to reduce or remove the need for customer's to provide personally identifying information to a vendor in order to facilitate a transaction. In one example, a customer instead provides a vendor with anonymized identifying information such as a pseudonym, pseudo payment information, pseudo address information, or the like, and the vendor, a payment processor, and/or an associated shipper de-anonymizes such data when fulfilling the transaction and or fulfilling delivery of a product to the customer.

Such techniques, however, do not mitigate all risk associated with providing personally identifying information. Generally, a customer must still provide personally identifying information to a vendor, a shipper, or the like in order for such entities to de-anonymize the anonymized data. An entity storing the personally identifying information may thus still be at risk, e.g., from data breaches, bad actors within the entity, or interception of a delivery.

Moreover, techniques have been developed to de-anonymize information based on aggregate data. In an example, anonymized information that includes shipping or transaction data may be mined to identify patterns in deliveries, purchases, or other data, and thereby identify an individual customer despite the anonymization of the personally identifying information.

Risks such as the above may be compounded when a transaction or delivery involves personally identifying information that can be used for other purposes. For example, a credit card may be shipped to a customer's address. If the delivery of the credit card is intercepted, then the person who intercepted the delivery may be in possession of not only the credit card but also the customer's name and billing address, which may be used to authenticate the credit card without the customer's knowledge or permission.

Accordingly, a need exists to obfuscate transaction information, and more particularly to anonymize shipping information and inhibit techniques of de-anonymizing such information based on aggregate data.

Figure 1:
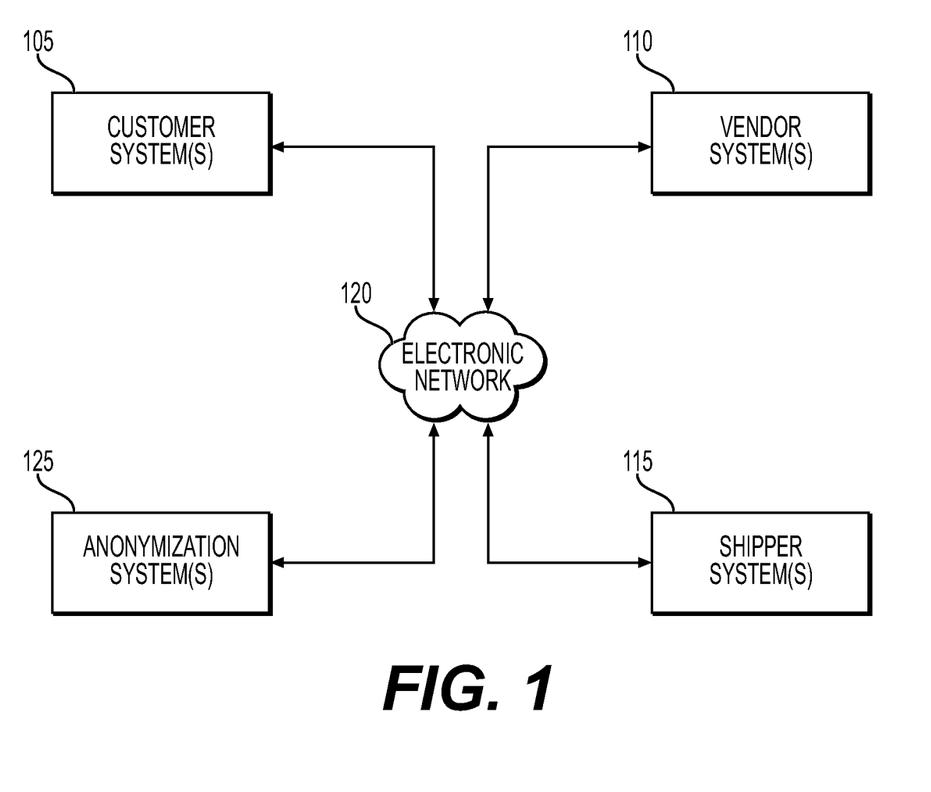
FIG. 1 depicts an exemplary client-server environment, having at least a vendor system and a shipper system, that may be utilized with techniques presented herein.

FIG. 1 depicts an exemplary client-server environment that may be utilized with techniques presented herein. One or more customer system(s) 105, one or more vendor system(s) 110 and/or one or more shipper system(s) 115 may communicate across an electronic network 120. The systems of FIG. 1 may communicate in any arrangement.

The customer system 105 may be associated with a customer, e.g., a customer engaged in a transaction to purchase a product. The vendor system 110 may be associated with a vendor, such as an e-commerce platform, with a payment platform such as a credit card processor or the like, or both. The shipper system 115 may be associated with a shipper engaged to ship products to customers on behalf of the vendor.

As will be discussed herein, one or more anonymization system(s) 125 may communicate with the customer system 105, vendor system 110, and/or the shipper system 115 over the electronic network 120 in anonymizing personally identifying information of the customer, facilitating transactions between the customer and the vendor, and/or facilitating deliveries from the vendor to the customer via the shipper.

In various embodiments, the electronic network 120 may be a wide area network ("WAN"), a local area network ("LAN"), personal area network ("PAN"), or the like. In some embodiments, electronic network 120 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

While FIG. 1 depicts the various systems as physically separate and communicating across network 120, in various embodiments, features of certain systems, for example, the customer system 105, the vendor system 110, and/or the anonymization system 125, may be incorporated partially or completely into any of the other systems of FIG. 1. Some or all of the functionality of a system may be incorporated into an internet browser extension or website page usable by a user. In some embodiments, a system, such as the shipper system 115 for example, may include multiple devices. In one example, a shipper system 115 includes a server or an inventory system as well as other devices such as a mobile device for interacting with deliveries and customers at an address for a delivery. In some embodiments, the anonymization system 125 includes a front-end system for interacting with customers, and a back-end system for interacting with vendors and/or shippers. In some embodiments, the anonymization system includes a first system embedded into or engaged with the vendor system 110, and a second system embedded into or engaged with the shipper system 115.

In an exemplary use case, a customer may operate a customer system 105 to engage with an e-commerce platform operated by a vendor system 110 over the electronic network 120. Upon the customer selecting a product for purchase, the vendor system 110 may prompt the customer for personally identifying information such as a name and address for the delivery of the product. Generally, vendors need such information to not only fulfill delivery of a product, but also to determine a total price of a purchase. For instance, the shipping cost for delivering the product and the taxes that may apply to the purchase may depend on the state or jurisdiction in which the product is sold and/or in which the delivery address is located.

However, rather than transmitting personally identifying information to the vendor system 110, the customer may enter in one or more of an anonymized identifier associated with the customer as a name for the delivery and/or a reference address for the customer as a delivery address. In some embodiments, the anonymized identifier and/or reference address entered by the customer may have been previously received by the customer from the anonymization system 125 as discussed in further detail below.

Because the reference address, however, is not indicative of an accurate address for the customer, the vendor system 110 is unable to determine tax and shipping costs for the purchase based on such anonymized information, and moreover is unable to fulfill the delivery of the product to the customer. To determine the tax and shipping costs for the transaction and/or to fulfill delivery of the product to the customer, the vendor system 110 may interact with one or more of the anonymization system 125 and the shipper system 115 over the electronic network 120.

Figure 2:
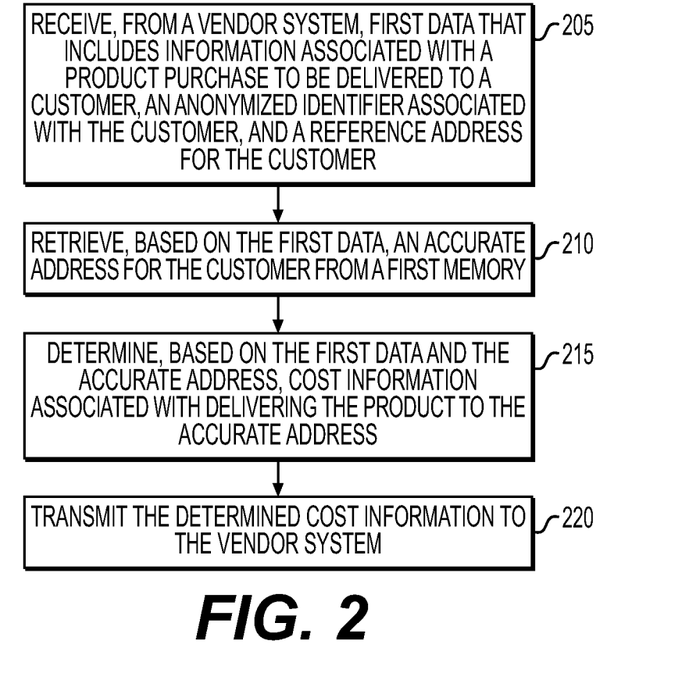
FIG. 2 depicts an exemplary embodiment of a process for facilitating fulfilment of a transaction with the vendor system of FIG. 1.

FIG. 2 illustrates an exemplary embodiment of a process for facilitating fulfilment of a transaction with a vendor system 110 using anonymized information. At step 205, the anonymization system 125 may receive first data from a vendor system 110 over the electronic network 120. The first data may include information associated with a purchase of a product to be delivered to a customer, an anonymized identifier associated with the customer, and a reference address for the customer.

Information associated with a purchase of a product may include, for example, shipping dimensions and/or shipping requirements for the product, or an origin address for shipment of the product. In some embodiments, the vendor may utilize multiple distribution locations. In some embodiments, the first data may include, instead of or in addition to the origin address, a list of distribution locations from which the origin address may be selected.

In some embodiments, the anonymized identifier may include a pseudonym for the customer. In some embodiments, the anonymized identifier includes a tokenized identifier, a key code, a hash identifier, or the like. The anonymized identifier may be usable, e.g., via the anonymization system 125, to retrieve information associated with the customer in an encrypted and/or protected fashion. For example, in some embodiments, the anonymous identifier may include a key usable by an application programming interface ("API") to access a database or the like and retrieve information associated with the customer. Any acceptable type or schema for using an anonymized identifier to identify a customer and/or retrieve information associated with the customer may be used.

In some embodiments, the reference address may include a fictitious address that does not actually exist. In some embodiments, the reference address may include a false or inaccurate address for the customer. In some embodiments, the reference address may include an incomplete version of the actual accurate address of the customer. In some embodiments, the reference address may include an address for a distribution location of the vendor and/or a shipper associated with the vendor.

At step 210, the anonymization system 125 may retrieve, based on the first data, an accurate address for the customer from a first memory. Any acceptable retrieval process may be used. In some embodiments, the anonymization system 125 may use at least a portion of the first data, e.g., the anonymized identifier, to lookup data associated with the customer in a database or the like stored on the first memory. For example, in some embodiments, e.g., where the anonymized identifier includes an API key, a tokenized identifier, a key code, a hash identifier, or the like, the anonymization system 125 may use the anonymized identifier to generate a query for a database to retrieve the accurate address of the customer from the database.

In some embodiments, such retrieval is based solely on the reference address received in the first data. For example, the reference address may operate as a pseudonym for the accurate address. In some embodiments, the retrieval is based solely on the anonymized identifier. For example, in some embodiments the anonymized identifier operates as a lookup key for a database in the first memory.

In some embodiments, the retrieval of the accurate address utilizes both the anonymized identifier and the reference address. For example, in some embodiments, the anonymized identifier may be hashed with the reference address. In other words, the reference address is usable to determine whether the anonymized identifier is authentic, or vice versa. In some embodiments, the anonymized identifier and the reference address may be utilized as a two-factor authentication for the retrieval of the accurate address of the customer.

In some embodiments, the first memory may be included with the anonymization system 125. In some embodiments, the first memory may be on a system remote from the anonymization system 125. In some embodiments, the retrieval of the accurate address may include utilization of an encryption and/or decryption process.

At step 215, the anonymization system 125, based on the first data and on the accurate address for the customer retrieved from the first memory, may determine cost information associated with delivering the product to the accurate address. In some embodiments, determining the cost information may include determining a shipping cost associated with the delivery of the product to the accurate address. In some embodiments, determining the cost information may include determining a tax cost associated with the purchase of the product. In some embodiments, determining the cost information may include determining a cost for anonymizing the customer's personally identifying information, which may be based, for example, on the determined shipping cost, a predetermined security selection entered by the customer, etc.

Generally, a shipping cost for delivering a product is based on one or more of the physical parameters of the product (e.g., size, weight, fragility, orientation, environmental requirements, etc.), the distance between a delivery location and an origin location, a speed for the delivery, or other factors. In some embodiments, determining the shipping cost may include determining an origin address based on the information associated with the purchase of the product from the first data. In some embodiments, the first data may include a list of distribution locations associated with the vendor and/or the shipper, and determining the origin address may include selecting a distribution location from the list. For example, in some embodiments, the anonymization system 125 may select a distribution location having a close proximity to the accurate address of the customer. In some embodiments, the anonymization system 125 may select a distribution location that is at least a threshold distance away from the accurate address of the customer.

In some embodiments, the anonymization system 125 may apply shipping rate rules to the origin address and the accurate address to determine the shipping cost. Shipping rate rules may include predetermined procedures for determining shipping costs based on origin and delivery locations, delivery speed, delivery size, and other factors. In some embodiments, the shipping rate rules are stored on the first memory or another memory. In some embodiments, the anonymization system 125 may communicate with another system to determine the shipping cost. For example, in some embodiments, the anonymization system 125 may retrieve the shipping rate rules from another system, e.g., the shipper system 115. In some embodiments, the anonymization system 125 may transmit the origin address and the accurate address to another system, e.g., the shipper system 115, and receive a shipping cost determination from the other system.

In some embodiments, the anonymization system 125 and/or the shipper system 115 segments the delivery of the product to the accurate address of the customer into discrete sections, and determines a cost of each section such that the shipping cost is a summation of the costs of the discrete sections. For example, in some embodiments, the anonymization system 125 transmits the origin address and a state from the accurate address to the shipper system 115 to request a cost for a first shipping segment, transmits the state and the city from the accurate address to request a cost for a second shipping segment, and transmits the city and street address to request a third shipping segment.

The tax cost associated with the purchase of the product may include, for example, sales tax, excise tax, retail tax, user fees, luxury tax, etc. The applicability of such taxes to a transaction and the values of applied taxes may depend on, for example, the product purchased, the origin address, the delivery address, or other factors. In some embodiments, the anonymization system 125, based on the information associated with the purchase of the product from the first data and on the accurate address of the customer, may determine one or more taxes applicable to the purchase and one or more values for the applicable tax(es).

In some embodiments, determining the cost information includes determining accurate cost information associated with delivering the product to the accurate address, and applying an anonymizing process to the accurate cost information. As noted above, even when associated with anonymized personally identifying information, information listing the cost information for shipping the product to the accurate address may be de-anonymized via, for example, data aggregation and data mining processes. In other words, information like tax and shipping costs might be used, e.g., via a machine learning model or a data mining engine, to identify the customer despite the use of an anonymized identifier. Anonymizing the cost information associated with delivering the product to the accurate address of the customer may mitigate that risk.

In some embodiments, the anonymizing process applied to the accurate cost information may include determining further cost information associated with delivering the product to an address other than the reference address and the accurate address. In other words, the anonymization system 125 may determine the further cost information for a different delivery of the product. In some embodiments, the anonymization system 125 may determine further cost information for a delivery of a product other than the product purchased by the customer. At least a portion of such further cost information may be used to substitute a corresponding portion of the accurate cost information. In some embodiments, the anonymizing process applied to the cost information may include adjusting at least a portion of the accurate cost information based on a random variable. In some embodiments, the anonymizing process applied to the cost information may include adjusting at least a portion of the accurate cost information based on a scaling factor. In various embodiments, the scaling factor may be based on or associated with a level of security associated with the purchase, a scalable area surrounding the accurate address, or other factors. In some embodiments, the scaling factor is predetermined, e.g., in some embodiments the scaling factor is previously selected by the customer, as discussed in further detail below.

In some embodiments, the anonymizing process applied to the accurate cost information may be configured such that the resulting anonymized cost information is equal to or greater than the accurate cost information. In some embodiments, the anonymizing process applied to the accurate cost information may be configured such that the resulting anonymized cost information is greater than the accurate cost information. In some embodiments, the anonymization system 125 may determine a difference between the anonymized cost information and the accurate cost information, and transmit a payment request to one or more of the vendor system 110 and the shipper system 115. In other words, in some embodiments, at least a portion of the increase in the cost information, and thus the increase in the total purchase price of the product, is available to cover a cost associated with the anonymization of the customer's personally identifying information. In some embodiments, at least a portion of the difference is available to be returned to the customer, is forwarded to the shipper, etc.

At step 220, the anonymization system 125 may transmit the determined cost information to the vendor system 110. In an exemplary use case, the vendor system 110 may determine a total purchase price for the product based on the received cost information, causes the customer system 105 to output the total purchase price and/or the cost information, and enables the customer to complete the transaction. In some embodiments, the vendor system 110 may communicate with or operate in conjunction with a payment processor or the like to facilitate the transaction. In response to completion of the transaction, the vendor system 110 may cause the product to be prepared for shipping and/or transmit a shipping request to the shipper system 115.

The transmission from the vendor system 110 to the shipper system 115 may include, for example, the anonymized identifier for the customer, the reference address, the origin address, information associated with the product like shipping weights or dimensions, or the like. Because the vendor system 110 may have received the anonymized identifier and the reference address, but may not have received the customer's actual name or accurate address, the request transmitted to the shipper system 115 may not include information generally required to make a delivery, e.g., the customer's name and accurate address. Thus, in some embodiments, the shipping system 115 may generate, e.g., based on the transmission from the vender system 110, second data that includes information associated with a delivery toward the reference address and/or the anonymized identifier for the customer.

Figure 3:
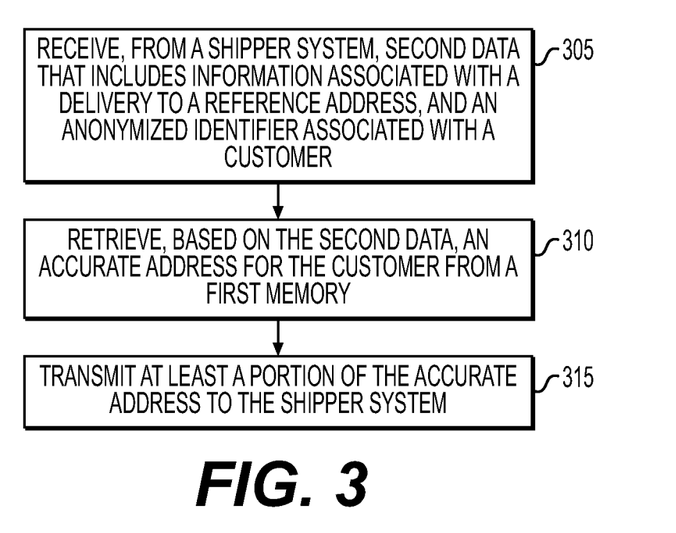
FIG. 3 depicts an exemplary embodiment of a process for facilitating a delivery of a product with the shipper system of FIG. 1.

FIG. 3 depicts an exemplary embodiment of a process for facilitating a delivery of a product with a shipper system 115. At step 305, the anonymization system 125 may receive second data from a shipper system 115. The second data may include, for example, information associated with a delivery toward the reference address such as the reference address, the origin address, information associated with the product like shipping weights or dimensions, or the like. In some embodiments, the second data includes the anonymized identifier for the customer. In some embodiments, the second data includes information associated with an identity and/or authority level of the shipper system 115.

At step 310, the anonymization system 125 may retrieve the accurate address for the customer from the first memory based on the second data. Such retrieval may operate in a manner similar to the retrieval in step 210 of FIG. 2, discussed above.

At step 315, the anonymization system 125 may transmit at least a portion of the accurate address to the shipper system 115. In some embodiments, the anonymization system 125 determines an identify and/or authentication level for the shipping system 115, and selects the portion of the accurate address to be transmitted to the shipper system 115 based on that determination. In some embodiments, the anonymization system 125 determines the portion of the accurate address such that only a portion of the address necessary for the delivery of the product to proceed to a next stage is transmitted.

For example, the information associated with the identity and/or authority level of the shipper system 115 may indicate that the shipper system 115 is associated with a distribution location of the shipper, and the anonymization system 125 may determine the portion of the accurate address to be transmitted is limited to only the city or state of the accurate address. In another example, the information associated with the identity and/or authority level of the shipper system 115 may indicate that the shipper system 115 is associated with a delivery worker of the shipper, and the anonymization system 125 may determine the portion of the accurate address to be transmitted includes the complete accurate address.

In some embodiments, the anonymizations system 125 and/or the shipper system 115 is configured to route the delivery through multiple distribution locations prior to a final routing toward the actual address. In some embodiments, the portion of the accurate address to be transmitted at each distributor location is limited to only information enabling delivery to the next distributor location until the delivery is finally routed toward the actual address.

Generally, the delivery worker fulfilling at least the final segment of a delivery needs to know the accurate address of the customer, and in some cases the name of the customer, in order to complete the delivery. In some instances, a product requires authentication by a customer before it is usable, such as a credit card which may be authenticated after receipt via a customer providing personally identifying information and/or information included with the credit card. Because the delivery worker may be in possession of the product and of information that may be usable to authenticate that type of product, e.g., the accurate address of the customer and the customer's name, there is a risk that the delivery worker or another person could intercept and/or fraudulently authenticate the product.

One way to mitigate this risk includes providing the delivery worker and/or the shipping system 115 only a pseudonym for the customer and/or the anonymized identifier, and not the customer's actual name. In such instances, authentication of the product may then require the customer's actual name. Another way to mitigate this risk is to authenticate the delivery of the product to the customer. Requiring delivery authentication may assist with maintaining a chain of custody for the product. In other words, until the delivery is authenticated, it can be assumed that the person or entity associated with the shipping system 115, e.g., the delivery worker, retains possession, and thus responsibility, for the product.

Figure 4:
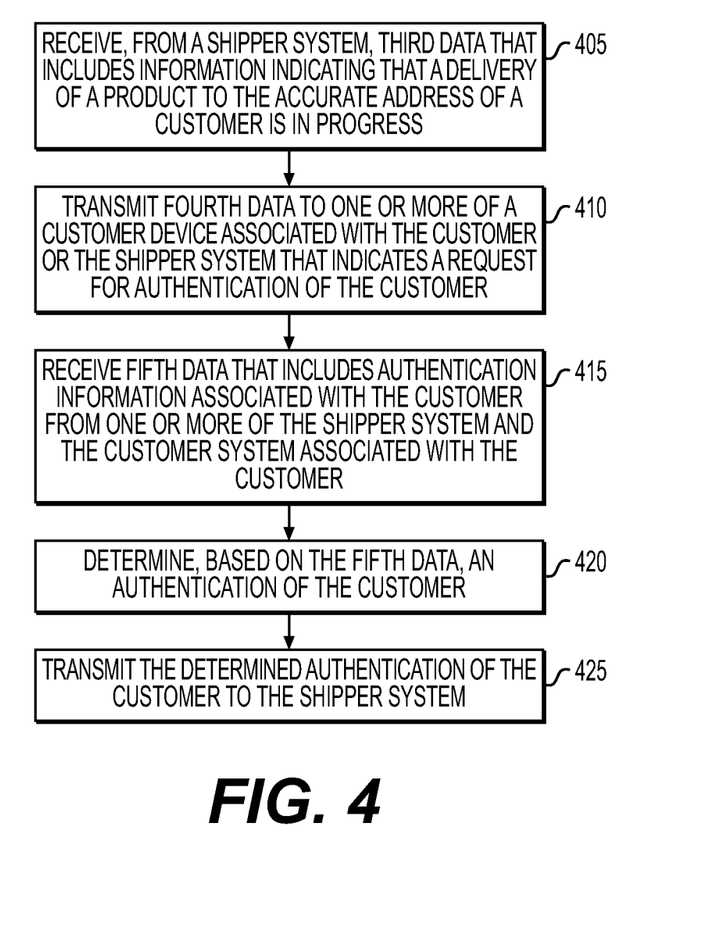
FIG. 4 depicts an exemplary embodiment of a process for authenticating a delivery of a product to a customer using the anonymization system of FIG. 1.

In an exemplary use case, in conjunction with arriving at the accurate address, a delivery worker may interact with a shipper system 115, e.g., via a mobile device, etc., to indicate that a delivery in progress is required to be authenticated. FIG. 4 depicts an exemplary embodiment of a process for authenticating a delivery of a product to a customer. At step 405, the anonymization system 125 may receive third data from a shipper system. Third data may include, for example, information indicating that the delivery of the product to the accurate address of the customer is in progress. At step 410, the anonymization system 125 may transmit fourth data to one or more of a customer device 105 associated with the customer and the shipper system 115 that includes and/or indicates a request for authentication of the customer. At step 415, the anonymization system 125 may receive fifth data that includes authentication information associated with the customer from one or more of the shipper system 115 and the customer system 105.

In some embodiments, the third data received from the shipper system 115 may include the fifth data, and in some embodiments, step 410 and/or step 415 may be omitted. In some embodiments, the fourth data may include a request to scan and/or retrieve verification information associated with the customer, e.g., a photo of a driver's license or other identification, a signature, or the like. In some embodiments, the fourth data may include a request for 2-factor authentication, e.g., authentication from another device that has predetermined authentication credentials. In an exemplary use case, a delivery worker interacts with a shipper system 115 such as a mobile device to request authentication of the delivery. Upon such interaction, the anonymization system 125 transmits a request for authentication to the customer device 105, e.g., the customer's mobile phone. The customer interacts with the customer device 105 to approve the authentication, whereby the customer device 105 transmits fifth data to the anonymization system 125 to confirm the authentication of the delivery by the customer.

At step 420, the anonymization system may determine, based on the fifth data, an authentication of the customer. For example, in some embodiments, the anonymization system 125 may determine that information included with the fifth data, e.g., the photo of the customer's driver's license or ID, matches information previously submitted by the customer. In some embodiments, fifth data received from the customer device 105 may include a passcode, authentication token, or the like that is usable by the anonymization system 125 to determine that the authentication of the customer is genuine. Any acceptable technique for authentication of the customer may be used.

At step 425, the anonymization system 125 may transmit the determined authentication of the customer to the shipper system 115. In some embodiments, the determined authentication includes an indication that the shipper system 115 and/or the delivery worker associated with the shipper system 115 is cleared to release the delivery to the customer.

Figure 5:
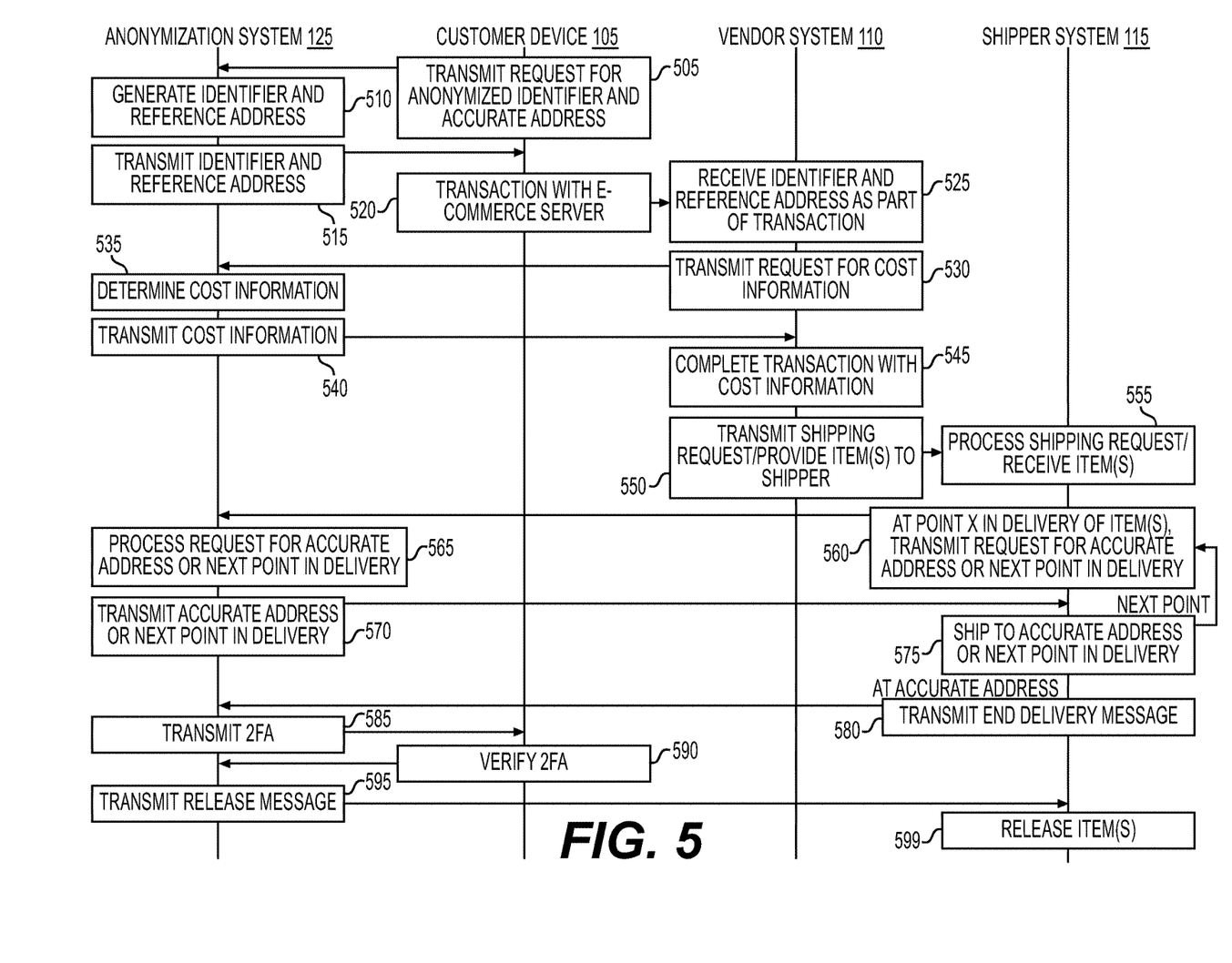
FIG. 5 depicts a transmission diagram illustrating an exemplary embodiment of a process for using the anonymization system of FIG. 1.

FIG. 5 depicts a transmission diagram illustrating an exemplary embodiment of a use case involving the anonymization system 125. At box 505, the customer, via the customer device 105, may desire to enable use of the anonymization system 125, and may transmit to the anonymization system 125 the customer's accurate address and a request for an anonymized identifier. In some embodiments, the customer uses the customer device 105 to access a website page or the like associated with the anonymization system 125 over the electronic network 120. In some embodiments, the customer is accessing an e-commerce platform associated with a vendor system 110 and, as part of a transaction or otherwise, accesses an option to enable anonymization services via the anonymization system 125.

At box 510, the anonymization system 125 may generate an anonymized identifier and a reference address for the customer. In some embodiments, generating the reference address may include selecting a distributer address associated with a shipper. For example, the anonymization system 125 may select a distributer address based on a distance of the distributor address from the actual address of the customer. In some embodiments, the request from the customer device 105 in box 505 may include a selection of one or more options, e.g., a level of security, a scalable threshold minimum distance from the actual address for the reference address, or the like, and the selection of the reference address is based on the customer's selection. The anonymized identifier may include a pseudonym for the customer, an API key, a tokenized identifier, or the like.

At box 515, the anonymization system 125 may transmit the generated identifier and reference address to the customer device 105. At box 520, the customer, using the customer device 105, may request to perform a transaction with the vendor system 110 and transmit the identifier and reference address to the vendor system 110. At box 525, the vendor system 110 may receive the identifier and reference address from the customer device 105. At box 530, the vendor system 110 may transmit a request to the anonymization system 125 for cost information for shipping a product from the requested transaction to the customer. The request may include the identifier and/or the reference address.

At box 535, the anonymization system 125 may determine cost information associated with requested transaction, e.g., by determining the accurate address of the customer based on the identifier and/or the reference address and determining the cost information based on the accurate address. At box 540, the anonymization system 125 may transmit the determined cost information to the vendor system 110. At box 545, the vendor system 110 may receive the determined cost information, and use the determined cost information to compete the requested transaction. In some embodiments, the vendor system 110 may determine a total price for the transaction based on the cost information, and request a confirmation to proceed from the customer device.

At box 550, the vendor system 110 may transmit a shipping request and/or provide products from the transaction for shipping to the shipper associated with the shipper system 115. In some embodiments, the request may include the reference address, which is the distributor address for the shipper selected by the anonymization system 125. At box 555, the shipper system 115 may process the shipping request and/or the products to be delivered, whereby the product is delivered to the reference address, e.g., the distributer address. At box 560, the shipper system 115 may transmit a request to the anonymization system 125 for the accurate address and/or a next point in the delivery of the product. In some embodiments, the request includes information associated with a current location of the product and/or an authorization level of the shipping system 115.

At box 565, the anonymization system 125 may receive the request from the shipper system 115, and processes the request. For example, the anonymization system 125 may identify the authorization level of the shipper system 115 and/or the current location of the product. The anonymization system 125 may determine an address or portion of the accurate address that may enable the shipper to deliver the product to a next point in the delivery. For example, in some embodiments, the anonymization system 125 may identify another distributor address, a state, city, or the like. In some embodiments, the anonymization system 125 may determine that the next point in the delivery is the accurate address of the customer. At box 570, the anonymization system 125 transmits the determined address and/or portion of the accurate address to the shipper system 115.

At box 575, the shipper system 115 causes the product to be delivered to the next point in the delivery based on the transmitted address and/or portion of the accurate address received from the anonymization system 125. In the case that the next point in the delivery is not the accurate address, the shipper system 115 returns to box 560 to submit another request to the anonymization system 125 for additional instructions. In the case that the next point in the delivery is the accurate address, the shipper system 115 proceeds to box 580, at which the shipper system 115 transmits a message to the anonymization system 125 indicating that delivery of the product to the customer is in progress.

At box 585, the anonymization system 125 transmits a two factor authentication request ("2FA") to the customer device 105. At box 590, the customer, via the customer device 105, verifies the 2FA, and causes the customer device 105 to transmit the verification to the anonymization system 125. At box 595, in response to the verification of the 2FA, the anonymization system 125 transmits a message to the shipper system 115 that includes an instruction to release the product to the customer. At box 599, in response to the instruction, the shipper system 115 causes the shipper to release the product to the customer.

Figure 6:
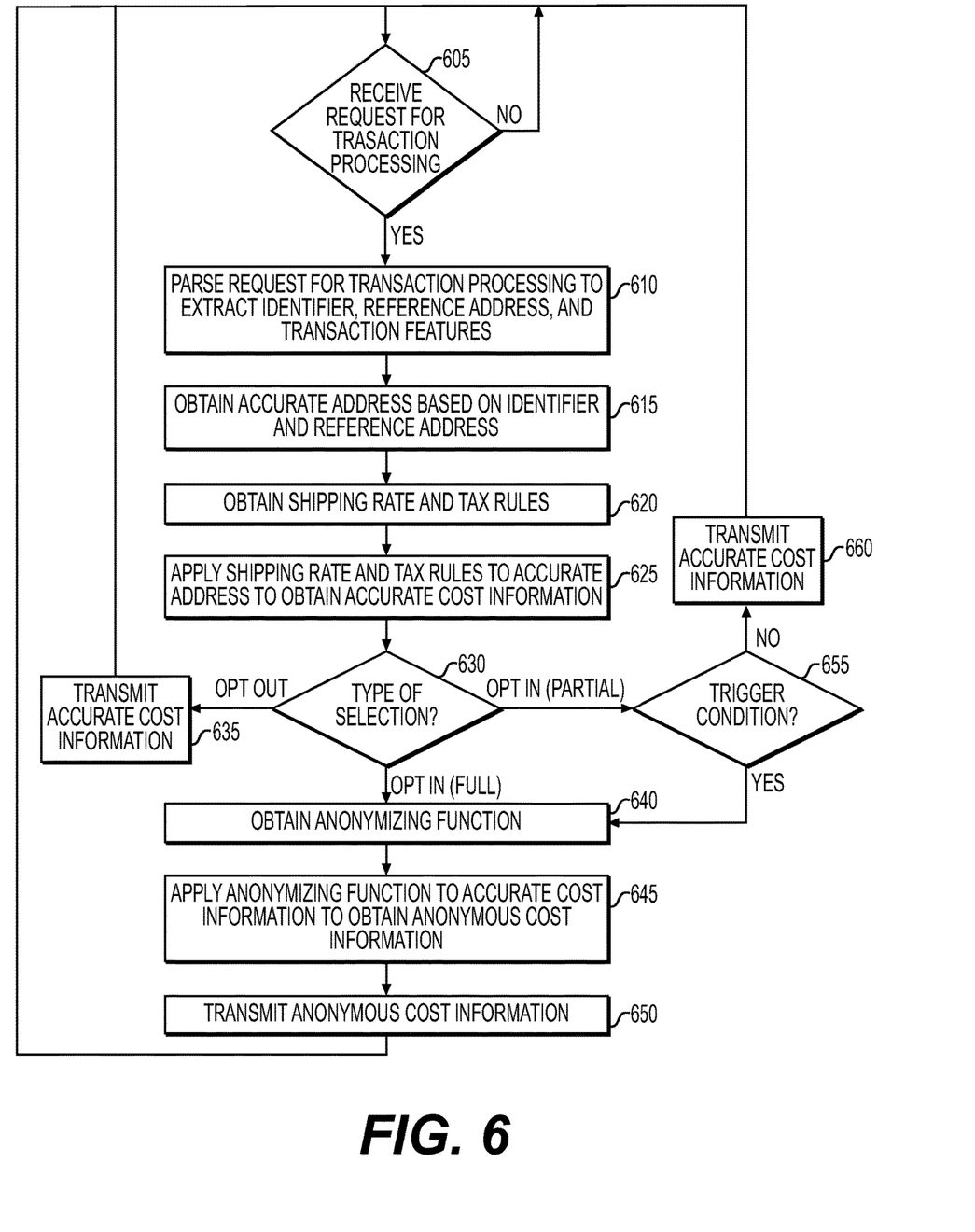
FIG. 6 depicts a flow diagram illustrating another exemplary embodiment of a process for using the anonymization system of FIG. 1.

As noted above, in some embodiments, when a customer desires to enable use of the anonymization system 125, the customer may make one or more selections such as a desired security level, etc. FIG. 6 depicts a flow diagram that illustrates an exemplary embodiment of how various selections by the customer may impact the utilization of the anonymization system 125. At step 605, the anonymization system 125 may receive a request for transaction processing. For example, a customer, via a customer device 105, may request a transaction for a product with a vendor system 110, and the vendor system 110 may transmit a request for processing to the anonymization system 125.

At step 610, the anonymization system 125 may parse the request to extract one or more of an anonymized identifier associated with the customer, a reference address associated with the customer, or an information associated with the transaction. In some embodiments, the information associated with the transaction and/or the anonymized identifier may include and/or be associated with one or more selections made by the customer associated with the anonymization system.

For example, in some embodiments, the customer may have made selections and/or the vendor system 110 may be configured such that utilizing the anonymization system 125 is selected by default. In some embodiments, the customer may have selected to opt out of such utilization. In some embodiments, the customer may have selected to only utilize the anonymization system 125 in response to one or more trigger conditions being satisfied for a particular transaction. A trigger condition may be associated with, for example, a price of a product in a transaction, a total transaction price, a category of product in the transaction, a distance for delivery of the product, a speed for delivering the product, whether the product is associated with personally identifying information or is of a private or sensitive nature, a security level selected by the customer, combinations thereof, or the like.

In some embodiments, parsing the request may include determining whether the request included the identifier and/or the reference address. In some embodiments, in response to determining the that the request does not include the identifier or reference address, e.g., when the request includes an actual address or incorrect or invalid information, the anonymization system 125 may be configured to transmit a response to the vendor system 110, suspend the method, or take other action. In some embodiments, in response to determining that the request does include the identifier and/or the reference address, the anonymization system 125 may be configured to proceed with the method.

At step 615, the anonymization system 125, based on the parsed information, may obtain an accurate address for the customer. At step 620, the anonymization system 125 may retrieve shipping rate rules, e.g., from a shipper system 115, or a database, or the like. At step 625, the anonymization system 125 may apply the shipping rate rules to the accurate address determine accurate cost information for delivering products from the transaction to the customer. At step 630, the anonymization system 125 may process the selection(s) made by the customer with regard to the anonymization system 125. In cases where the customer has selected to opt out from utilizing the anonymization system 125, at step 635, the anonymization system 125 transmits the accurate cost information to the vendor system 110.

In cases where the customer has selected to opt in, e.g., by default or in full, at step 640, the anonymization system 125 obtains an anonymizing function for anonymizing the accurate cost information. At step 645, the anonymization system 125 applies the anonymizing function to the accurate cost information to obtain anonymous cost information. At step 650, the anonymization system 125 transmits the anonymous cost information to the vendor system 110.

In cases where the customer has selected to opt in only when one or more trigger conditions have been met, at step 655, the anonymization system 125 determines whether the one or more trigger conditions set by the customer have been satisfied. In cases where the one or more trigger conditions have been satisfied, the anonymization system 125 proceeds to step 640. In cases where the one or more trigger conditions have not been satisfied, the anonymization system 125 proceeds to step 660, and transmits the accurate cost information to the vendor system 110.

Additional features are discussed in the further exemplary embodiments below.

In some embodiments, a computer-implemented method may include receiving first data from a vendor system. The first data may include: information associated with a purchase of a product to be delivered to a customer; an anonymized identifier associated with the customer; and a reference address for the customer. The method may further include: based on the first data, retrieving an accurate address for the customer from a first memory; based on the first data and the accurate address, determining cost information associated with delivering the product to the accurate address; and transmitting the determined cost information to the vendor system.

In some embodiments, determining the cost information associated with delivering the product to the accurate address may include: determining a shipping cost associated with the delivery; and determining a tax cost associated with the purchase of the product.

In some embodiments, determining the shipping cost associated with the delivery may include: determining an origin address based on the information associated with the purchase of the product from the first data; and applying shipping rate rules to the origin address and accurate address.

In some embodiments, determining the cost information associated with delivering the product to the accurate address may include: determining accurate cost information associated with delivering the product to the accurate address; and applying an anonymizing process to the accurate cost information.

In some embodiments, the anonymizing process may include one or more of: determining further cost information associated with delivering the product to an address other than the reference address and the accurate address, and substituting at least a portion of the accurate cost information with a corresponding portion of the further cost information; adjusting at least a portion of the accurate cost information based on a random variable; or adjusting at least a portion of the accurate cost information based on a scaling factor, a magnitude of the scaling factor associated with a scalable area surrounding the accurate address.

In some embodiments, the anonymizing process may be configured such that the anonymized cost information is equal to or greater than the accurate cost information.

In some embodiments, the method further includes: determining a difference between the anonymized cost information and the accurate cost information; and transmitting a payment request to a shipper system based on the determined difference.

In some embodiments, the method further includes: receiving second data from a shipping system, the second data including information associated with a delivery directed toward the reference address; based on the second data, retrieving the accurate address for the customer from the first memory; transmitting at least a portion of the accurate address to the shipping system.

In some embodiments, the method further includes: determining an authentication level of the shipping system based on the second data; and selecting the at least portion of the accurate address to be transmitted based on the determined authentication level.

In some embodiments, the method further includes: receiving third data from a shipping system, the third data including information indicative that a delivery of the product to the accurate address is in progress; transmitting fourth data to the shipping system, the fourth data including a request for authentication of the customer; receiving fifth data from one or more of a customer system associated with the customer and the shipping system, the fifth data including authentication information associated with the customer; determining, based on the fifth data, an authentication of the customer; and transmitting the determined authentication of the customer to the shipping system.

Figure 7:
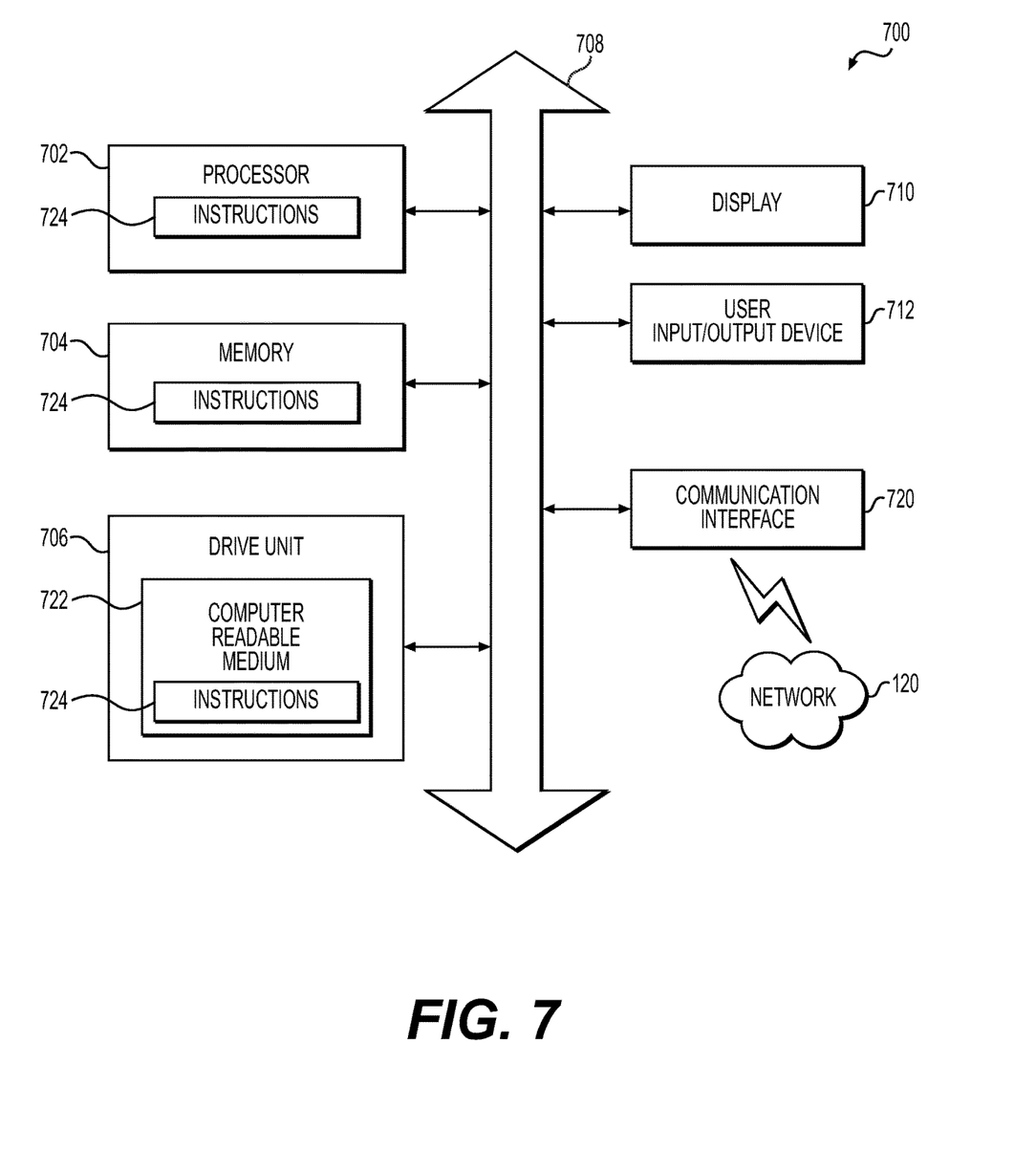
FIG. 7 depicts an example of a computing device, according to aspects of the present disclosure.

FIG. 7 is a simplified functional block diagram of a computer 700 that may be configured as a device for executing the methods of FIGS. 2-6, according to exemplary embodiments of the present disclosure. FIG. 7 is a simplified functional block diagram of a computer that may be configured as the anonymization system 125 according to exemplary embodiments of the present disclosure. In various embodiments, any of the customer systems, vender systems, shipper systems, payment processors, etc., discussed herein may be an assembly of hardware 700 including, for example, a data communication interface 720 for packet data communication. The platform also may include a central processing unit ("CPU") 702, in the form of one or more processors, for executing program instructions. The platform may include an internal communication bus 708, and a storage unit 706 (such as ROM, HDD, SDD, etc.) that may store data on a computer readable medium 722, although the system 700 may receive programming and data via network communications. The system 700 may also have a memory 704 (such as RAM) storing instructions 724 for executing techniques presented herein, although the instructions 724 may be stored temporarily or permanently within other modules of system 700 (e.g., processor 702 and/or computer readable medium 522). The system 500 also may include input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2-4, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for anonymizing online transaction details, the method comprising:
   receiving, at an anonymization system and from an e-commerce server, first data associated with a purchase of a product from the e-commerce server, the purchase to be delivered to a customer, wherein the first data includes an anonymized identifier (ID) associated with the customer and a reference address for the customer;
   forwarding, by the anonymization system, the received first data to a first memory location in a memory of the anonymization system;
   receiving, by the first memory location, the forwarded first data;
   obtaining, via the anonymization system, an accurate address for the customer based on the ID and the reference address;
   determining cost information associated with a delivery of the purchase to the accurate address for the customer, by:
      requesting, by the anonymization system, a set of shipping rules from a second memory location of the memory;
      outputting, by the second memory location, the set of shipping rules to the anonymization system;
      requesting, by the anonymization system, the first data from the first memory location;
      outputting, by the first memory location, the first data to the anonymization system;
      determining accurate cost information associated with delivering the product to the accurate address by applying the first data and the accurate address to the set of shipping rules; and
      applying an anonymizing process to the accurate cost information; and
   transmitting, via the anonymization system, the determined cost information to the e-commerce server.

2. The computer-implemented method of claim 1, wherein determining the cost information associated with delivering the product to the accurate address further includes:
   determining a shipping cost associated with the delivery; and
   determining a tax cost associated with the purchase of the product.

3. The computer-implemented method of claim 2, wherein determining the shipping cost associated with the delivery includes:
   determining an origin address based on the information associated with the purchase of the product from the first data; and
   applying the set of shipping rules to the origin address and the accurate address.

4. The computer-implemented method of claim 1, wherein the anonymizing process includes one or more of:
   determining further cost information associated with delivering the product to an address other than the reference address and the accurate address, and substituting at least a portion of the accurate cost information with a corresponding portion of the further cost information; or
   adjusting at least a portion of the accurate cost information based on a random variable.

5. The computer-implemented method of claim 1, wherein the anonymizing process is configured such that anonymized cost information determined via the anonymizing process is equal to or greater than the accurate cost information.

6. The computer-implemented method of claim 5, further comprising:
   determining, via the anonymization system, a difference between the anonymized cost information and the accurate cost information; and
   transmitting a payment request to a shipper system based on the determined difference.

7. The computer-implemented method of claim 1, further comprising:

receiving, at the anonymization system, second data from a shipping system, the second data including information associated with a delivery directed toward the reference address;

based on the second data, transmitting, via the anonymization system, at least a portion of the accurate address to the shipping system.

8. The computer-implemented method of claim 7, further comprising:

determining, via the anonymization system, an authentication level of the shipping system based on the second data; and selecting the at least portion of the accurate address to be transmitted based on the determined authentication level.

9. The computer-implemented method of claim 1, further comprising:

receiving third data from a shipping system, the third data including information indicative that a delivery of the product to the accurate address is in progress;

transmitting fourth data to the shipping system, the fourth data including a request for authentication of the customer;

receiving fifth data from one or more of a customer system associated with the customer and the shipping system, the fifth data including authentication information associated with the customer;

determining, based on the fifth data, an authentication of the customer; and transmitting the determined authentication of the customer to the shipping system.

10. A system for anonymizing delivery information, comprising:

a memory including:
  instructions;
  a first memory location; and
  a second memory location storing a set of shipping rules; and at least one processor operatively connected to the memory and configured to execute the instructions to perform operations, including:

receiving, from an e-commerce server, first data associated with a purchase of a product from the e-commerce server, the purchase to be delivered to a customer, wherein the first data includes an anonymized identifier (ID) associated with the customer and a reference address for the customer;

forwarding, by the anonymization system, the received first data to the first memory location in the memory, the first memory location configured to receive the forwarded first data;

obtaining an accurate address for the customer based on the ID and the reference address;

determining cost information associated with a delivery of the purchase to the accurate address for the customer, by:

requesting the set of shipping rules from the second memory location of the memory, the second memory location configured to output the set of shipping rules to the anonymization system;

requesting the first data from the first memory location, the first memory location configured to output the first data to the anonymization system;

determining accurate cost information associated with delivering the product to the accurate address by applying the first data and the accurate address to the set of shipping rules; and applying an anonymizing process to the accurate cost information; and transmitting the determined cost information to the e-commerce server.

11. The system of claim 10, wherein determining the cost information associated with delivering the product to the accurate address includes:

determining a shipping cost associated with the delivery; and determining a tax cost associated with the purchase of the product.

12. The system of claim 11, wherein determining the shipping cost associated with the delivery includes:

determining an origin address based on the information associated with the purchase of the product from the first data; and applying the set of shipping rules to the origin address and the accurate address.

13. The system of claim 10, wherein determining the cost information associated with delivering the product to the accurate address includes:

determining accurate cost information associated with delivering the product to the accurate address; and applying an anonymizing process to the accurate cost information.

14. The system of claim 13, wherein the anonymizing process includes one or more of:

determining further cost information associated with delivering the product to an address other than the reference address and the accurate address, and substituting at least a portion of the accurate cost information with a corresponding portion of the further cost information;

adjusting at least a portion of the accurate cost information based on a random variable; or adjusting at least a portion of the accurate cost information based on a scaling factor, a magnitude of the scaling factor associated with a scalable area surrounding the accurate address.

15. The system of claim 13, wherein the anonymizing process is configured such that anonymized cost information determined via the anonymizing process is equal to or greater than the accurate cost information.

16. The system of claim 15, wherein the operations further include determining a difference between the anonymized cost information and the accurate cost information; and transmitting a payment request to a shipper system based on the determined difference.

17. The system of claim 10, wherein the operations further include:

receiving second data from a shipping system, the second data including information associated with a delivery directed toward the reference address;

based on the second data, transmitting at least a portion of the accurate address to the shipping system.

18. The system of claim 17, wherein the operations further include:

determining an authentication level of the shipping system based on the second data; and selecting the at least portion of the accurate address to be transmitted based on the determined authentication level.

19. The system of claim 10, wherein the operations further include:

receiving third data from the respective shipping system, the third data including information indicative that a release of the product to the accurate address is in progress;

transmitting fourth data to one or more of a customer system associated with the customer or the respective shipping system, the fourth data including a request for authentication of the customer;

receiving fifth data from one or more of the customer system or the respective shipping system, the fifth data including authentication information associated with the customer;

determining, based on the fifth data, an authentication of the customer;

transmitting an authentication of the release of the product to the respective shipping system.

20. A non-transitory computer-readable medium comprising instructions for anonymizing delivery information that are executable by at least one processor to perform operations, including:

receiving, from an e-commerce server, first data associated with a purchase of a product from the e-commerce server, the purchase to be delivered to a customer, wherein the first data includes an anonymized identifier (ID) associated with the customer and a reference address for the customer;

forwarding the received first data to a first memory location in a memory, the first memory location configured to receive the forwarded first data;

obtaining an accurate address for the customer based on the ID and the reference address;

determining cost information associated with a delivery of the purchase to the accurate address for the customer, by:

requesting a set of shipping rules from a second memory location of the memory, the second memory location configured to output the set of shipping rules;

requesting the first data from the first memory location, the first memory location configured to output the first data;

determining accurate cost information associated with delivering the product to the accurate address by applying the first data and the accurate address to the set of shipping rules; and applying an anonymizing process to the accurate cost information; and transmitting the determined cost information to the e-commerce server.

* * * * *